(No Model.)
J. T. RIVES.
INSECT DESTROYER.
No. 376,784. Patented Jan. 24, 1888.
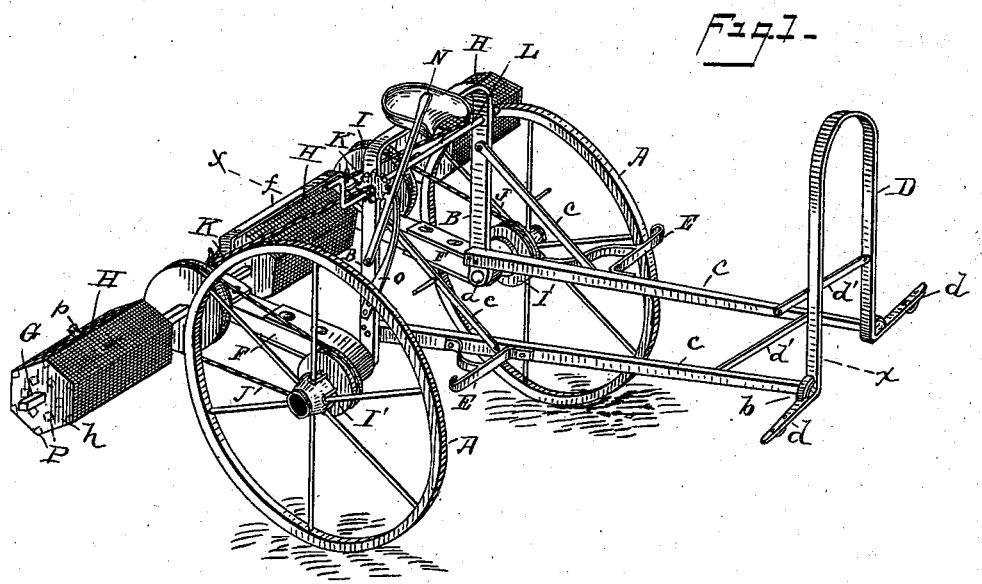
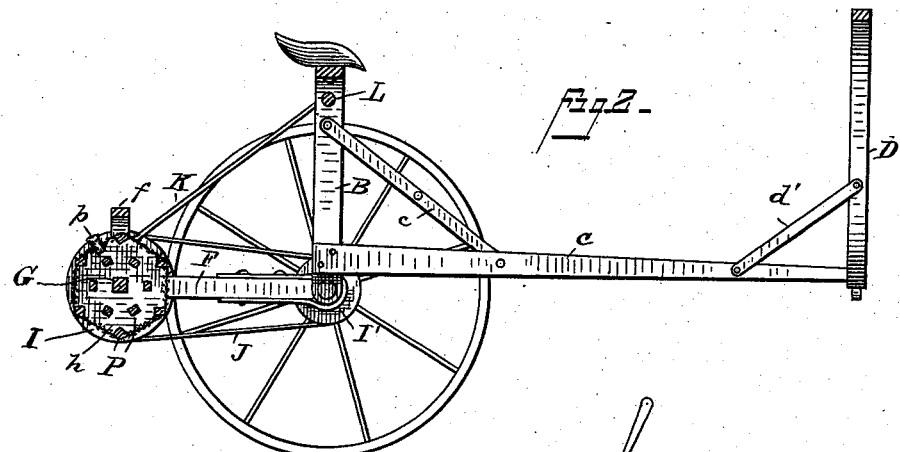
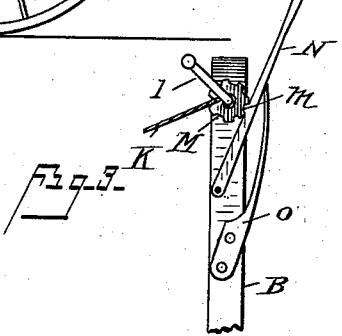
WITNESSES
H. D. Nealy
F. C. McCormick
INVENTOR
John T. Rives
By his Atty.
M. D. Peck

UNITED STATES PATENT OFFICE.

JOHN T. RIVES, OF WHARTON, TEXAS.

INSECT-DESTROYER.

SPECIFICATION forming part of Letters Patent No. 376,784, dated January 24, 1888.

Application filed October 10, 1887. Serial No. 251,920. (No model.)

*To all whom it may concern:*

Be it known that I, JOHN T. RIVES, a citizen of the United States, residing at Wharton, in the county of Wharton and State of Texas, have invented certain new and useful Improvements in Machines for Destroying Cotton-Worms; and I do hereby declare the following to be a full, clear, and exact description of the invention, such as will enable others skilled in the art to which it appertains to make and use the same, reference being had to the accompanying drawings, which form part of this specification.

My invention relates to an improvement in machines for sprinkling poison-powder on plants to destroy the insects with which they are infested; and it consists in the construction and combination of parts more fully hereinafter described, and particularly pointed out in the claims.

The more particular object of my invention is to provide a machine for sprinkling powder on cotton-plants which is simple in its construction, readily handled, and so arranged as to admit of its operation without injuring the plants. I attain this object by the machine illustrated in the accompanying drawings, wherein like letters of reference indicate corresponding parts in the several views, and in which—

Figure 1 represents a perspective view of my improved machine; Fig. 2, a longitudinal sectional elevation on the line $x$ $x$ of Fig. 1; Fig. 3, a detail end view of the raising and lowering device and the lever.

In the drawings, A represents the wheels of the machine, which are mounted on stub-axles $a$, having their inner ends rigidly secured to the lower ends of an arched upright frame, B. On the upper portion of frame B is placed the seat for the operator or driver.

Secured to the lower ends of frame B, directly above the axles $a$, are the thills or poles C, which extend out at right angles to the frame. The outer ends of these thills are united by an upwardly-extending V-shaped yoke, D, the lower ends, $d$, of which are bent out at right angles to form neck-yokes for the draft-animals, the ends of said thills being rigidly secured in the angles of the yoke D and neck-yoke $d$ by suitable bands or ties, $b$. To assist in retaining the V-shaped portion of the yoke D in its upright position, braces $d'$ are secured thereto, which extend down and have their lower ends attached to the thills C.

To give rigidity to the structure and prevent strain on the inner ends of thills C, braces $c$ are secured to the upper portion of the sides of frame B, which extend down at an incline and are secured to the thills a short distance back from their centers.

Projecting out from the sides of the thills at a point about parallel with the periphery of the wheels are draft-arms E, which are secured to the thills, and the singletrees are secured, by which the draft-animals are attached to the machine. There are pivotally secured to the axles $a$, between the frame and wheels, rearwardly-extending arms F, having their outer ends connected by a bridge or brace-strip, $f$. Journaled in suitable bearings formed in the outer ends of said arms F is a horizontally-arranged rotating shaft, G, its ends extending out on both sides beyond the wheels of the machine. Mounted on the ends and at the center, below the brace $f$ of said shaft G, is a series of hexangular sifters, H, formed of end pieces $h$, which are secured to the shaft G. Around the shaft there are braces P, connecting the end pieces A. Part of these braces are secured near the edges of said end pieces, and serve as a frame upon which loosely-woven fabric of cloth, wire, or other suitable material is stretched and secured, forming the sieves or sifters, while the inner braces serve as brakes for keeping the poisonous powder from caking or lumping in the sifters. To supply these sifters with powder, the plugs or stoppers $p$, which are placed in openings made in the side of the sifters, are withdrawn and the powder inserted through the opening. On the shaft G, between the sieves or sifters H, there are grooved pulleys I, rigidly mounted, which register with grooved pulleys I', secured to the inner portions of the hubs of the wheels. Belts or bands J are placed on said pulleys, which transmit the rotary movement of the wheels to the shaft G as the machine is moved or drawn.

To admit of an upward or downward adjustment of the sieves to adapt the machine for use with high or low plants, cords K are attached to the outer ends of arms F and extend upward and forward, and are secured to the end portions of a cylindrical shaft, L, which is mounted in bearings in the upper vertical portion of the frame B, its ends extending beyond said frame. One of said end portions of shaft L is bent to form a crank, *l*, and has rigidly mounted thereon adjacent to its bearing a ratchet-wheel, M, which is engaged by a tooth, *m*, formed on the side of a lever, N. This lever is pivotally secured to the side of frame B and extends up within easy reach of the operator. To retain the lever N in a position which engages the tooth *m* with ratchet-wheel M, and also admit of its being withdrawn therefrom, a curved spring, O, is secured to the side of frame B below the lever N, its upper free end extending up and contacting with said lever opposite the tooth *m*. Thus the operator by forcing the lever out disengages the tooth from the ratchet-wheel, and the spring immediately forces the same back, when the lever is released. By this construction it will be seen that I am enabled to sprinkle three rows of plants at the same time without danger of injuring the central row by the low parts of the machine or the animals coming in contact therewith; but, owing to the arched frame B and V-shaped yoke D, they pass freely between the same and beneath the central sieves or sifters.

By the construction of the sieves in a hexangular shape a more perfect escapement of the powder is acquired than in sieves of a cylindrical shape. Owing to their flat sides and the outer braces, the powder is carried farther up as the sieves rotate, and is thereby precipitated with more force against the meshes of the lower portion, and thus escaping through the same.

It is obvious that many minor changes in the construction and arrangement of the parts of my machine can be made and substituted for those shown and described without in the least departing from the nature and principles of my invention.

Having thus described my invention, what I claim as new, and desire to secure by Letters Patent of the United States, is—

1. A poison-sprinkling machine consisting of wheels mounted on stub-axles, with an arched frame connecting the same, and vertical adjustable rotary sifters in the rear thereof operated by the wheels, said frame having thills secured thereto, and an arched yoke connecting the outer ends of said thills, whereby a way is formed through the center of the machine to pass over plants higher than the axle, as set forth.

2. In a poison-sprinkling machine, the combination, with the wheels mounted on stub-axles, with vertically-adjustable rotary sifters in the rear operated by the wheels, of an arched frame connected to said axles, said frame having thills secured thereto, and an arched yoke having its ends bent outward to form neck-yokes and secured to the outer ends of said thills, and draft-arms secured to the sides of said thills, as set forth.

3. In a poison-sprinkler, the combination, with the wheels on stub-axles, with rearwardly-extended arms pivotally secured to the axles, and a horizontal shaft journaled in said arms, having sifters thereon, of a cylindrical shaft journaled in the upright frame of the axle, having a crank on one end thereof, and a ratchet-wheel secured to said shaft, and a spring-actuated lever on the frame below the shaft, having a tooth thereon engaging said ratchet, and cords attached to said shaft and to the outer ends of the rearwardly-extending arms, adapting the sifter-shaft to be adjusted to the height of the upright frame of the axle, as set forth.

4. A poison-sprinkling machine composed of stub-axles having wheels and pulleys thereon, uprights on the inner ends of the axles extended to form an arched frame above the axles, having an adjusting-rod near its top, thills or poles extended forward from the lower ends of the uprights and united at their front ends by a yoke equal in height to the arched frame, the yoke having its ends extended outward from the thills, pivoted arms extending back from the axles and united by a brace, said arms carrying a shaft with sifters and pulleys thereon, adapted to be raised by the adjusting-rod to the height of the arched frame and yoke, as and for the purpose set forth.

In testimony whereof I affix my signature in presence of two witnesses.

JOHN T. RIVES.

Witnesses:
D. P. GULLATT,
G. G. KELLEY.